(12) United States Patent
Ripple et al.

(10) Patent No.: US 8,594,149 B2
(45) Date of Patent: Nov. 26, 2013

(54) METHOD FOR THE SECURE TRANSMISSION OF INFORMATION USING MULTIPLE LPD AND LPI SECONDARY CARRIERS UNDER A PRIMARY CARRIER WITH RELATIVE CARRIER OFFSET

(75) Inventors: Andrew Ripple, Lovettsville, VA (US); Michael Beeler, Jefferson, MD (US)

(73) Assignee: Comtech EF Data Corp., Tempe, AZ (US)

( * ) Notice: Subject to any disclaimer, the term of this patent is extended or adjusted under 35 U.S.C. 154(b) by 376 days.

(21) Appl. No.: 13/071,417

(22) Filed: Mar. 24, 2011

(65) Prior Publication Data
US 2011/0170574 A1 Jul. 14, 2011

Related U.S. Application Data

(60) Provisional application No. 61/378,276, filed on Aug. 30, 2010.

(51) Int. Cl.
*H04B 1/00* (2006.01)
(52) U.S. Cl.
USPC .......................................... 375/130; 375/140

(58) Field of Classification Search
USPC ......... 375/130, 132–133, 135–136, 140–141, 375/146–147, 295, 316
See application file for complete search history.

(56) References Cited

U.S. PATENT DOCUMENTS

| | | | |
|---|---|---|---|
| 5,612,960 A * | 3/1997 | Stevens et al. | 714/712 |
| 7,020,178 B2 * | 3/2006 | Mason et al. | 375/136 |
| 7,120,198 B1 * | 10/2006 | Dafesh et al. | 375/261 |
| 7,230,971 B1 * | 6/2007 | Beard | 375/132 |
| 2009/0093216 A1 * | 4/2009 | Sun et al. | 455/62 |

* cited by examiner

*Primary Examiner* — Khanh C Tran
(74) *Attorney, Agent, or Firm* — Booth Udall Fuller, PLC

(57) ABSTRACT

A method of reducing probability of detection and interception of a sub-carrier signal comprising encoding, using an encoder, information that is to be transmitted via the sub-carrier signal, modulating, using a modulator, the encoded information such that a modulated sub-carrier signal results, spreading, using a spreader, the modulated sub-carrier signal such that a spread sub-carrier signal results, and transmitting the spread sub-carrier signal at a frequency that is dynamic relative to an original carrier signal having a static frequency.

56 Claims, 6 Drawing Sheets

METHOD FOR THE SECURE TRANSMISSION OF INFORMATION USING MULTIPLE LPD AND LPI SECONDARY CARRIERS UNDER A PRIMARY CARRIER WITH RELATIVE CARRIER OFFSET

CROSS REFERENCE TO RELATED APPLICATIONS

This document claims the benefit of the filing date of U.S. Provisional Patent Application No. 61/378,276, entitled "A Method for the Secure Transmission of Information Using Multiple LPD and LPI Secondary Carriers under a Primary Carrier with Relative Carrier Offset" to Andrew Ripple, et al., which was filed on Aug. 30, 2010, the disclosure of which is hereby incorporated entirely by reference herein.

BACKGROUND

1. Technical Field

Aspects of this document relate generally to telecommunication systems and techniques for transmitting data across a telecommunication channel.

2. Background Art

Providing a communications path that is reliable, yet secure, can be challenging. Conventional systems use a variety of approaches for ensuring a communications path is secure using Transmission Security (TRANSEC) techniques to mask the traffic load, obfuscate the traffic, lower the probability of detection, lower the probability of interception and provide an approach for authentication. Thus, a need exists to provide a TRANSEC solution that may be used in a secure communications link using the same Radio Frequency (RF) spectrum for transmission of the primary information channel and the secondary TRANSEC channel or channels.

SUMMARY

Implementations of a method of reducing probability of detection and interception of a sub-carrier signal may comprising encoding, using an encoder, information that is to be transmitted via the sub-carrier signal, modulating, using a modulator, the encoded information such that a modulated sub-carrier signal results, spreading, using a spreader, the modulated sub-carrier signal such that a spread sub-carrier signal results, and transmitting the spread sub-carrier signal at a frequency that is dynamic relative to an original carrier signal having a static frequency.

Particular implementations may comprise one or more of the following features. Methods may further comprise encrypting, using an encryption device, the information prior to encoding. The spreading may use a Pseudo Random Number (PRN) such that the spread sub-carrier signal has a Direct Sequence Spread Spectrum (DSSS) or the spreading may uses a PRN to randomize a Frequency Hopping Spread Spectrum (FHSS) that results in hopping of a center frequency of the sub-carrier signal. Methods may further comprise steering the center frequency of the sub-carrier signal relative to a center frequency of the original carrier signal using a Direct Digital Synthesizer (DDS) or a Number Controlled Oscillator (NCO). Methods may further comprise combining, using an embedding device, the sub-carrier signal and original carrier signal such that a composite carrier signal results.

Implementations of a method of reducing probability of detection and interception of a sub-carrier signal comprising encoding, using an encoder, information that is to be transmitted via the sub-carrier signal, modulating, using a modulator, the encoded information such that a modulated sub-carrier signal results, spreading, using a spreader, the modulated sub-carrier signal such that a spread sub-carrier signal results, and transmitting the spread sub-carrier signal at a frequency that is dynamic relative to an original carrier signal having a dynamic frequency wherein the differential between the frequencies of the sub-carrier signal and original carrier signal is dynamic.

Particular implementations may comprise one or more of the following features. Methods may further comprise encrypting, using an encryption device, the information prior to encoding. The spreading may use a Pseudo Random Number (PRN) such that the spread sub-carrier signal has a Direct Sequence Spread Spectrum (DSSS) or the spreading may use a PRN to randomize a Frequency Hopping Spread Spectrum (FHSS) that results in hopping of a center frequency of the sub-carrier signal. Methods may further comprise using a PRN to randomize a Frequency Hopping Spread Spectrum (FHSS) that results in hopping of a center frequency of the original carrier signal. Methods may further comprise steering the center frequency of the sub-carrier signal relative to a center frequency of the original carrier signal using a Direct Digital Synthesizer (DDS) or a Number Controlled Oscillator (NCO). Methods may further comprise steering the center frequency of the original carrier signal using a Direct Digital Synthesizer (DDS) or a Number Controlled Oscillator (NCO). Methods may further comprise combining, using an embedding device, the sub-carrier signal and original carrier signal such that a composite carrier signal results.

Implementations of a method of reducing probability of detection and interception of a sub-carrier signal may comprise encoding, using an encoder, information that is to be transmitted via the sub-carrier signal, modulating, using a modulator, the encoded information such that a modulated sub-carrier signal results, spreading, using a spreader, the modulated sub-carrier signal such that a spread sub-carrier signal results, and transmitting the spread sub-carrier signal at a frequency that is dynamic relative to an original carrier signal having a dithering frequency movement wherein the differential between the frequencies of the sub-carrier signal and original carrier signal is constant.

Particular implementations may comprise one or more of the following features. Methods may further comprise encrypting, using an encryption device, the information prior to encoding. The spreading may use a Pseudo Random Number (PRN) such that the spread sub-carrier signal has a Direct Sequence Spread Spectrum (DSSS). Methods may further comprise using a control algorithm to dither a center frequency of the original carrier signal. The spreading may use a PRN to randomize a Frequency Hopping Spread Spectrum (FHSS) for dithering a center frequency of the sub-carrier signal. Methods may further comprise steering the center frequency of the original carrier signal using a Direct Digital Synthesizer (DDS) or a Number Controlled Oscillator (NCO). Methods may further comprise steering the center frequency of the sub-carrier signal relative to a center frequency of the original carrier signal using a Direct Digital Synthesizer (DDS) or a Number Controlled Oscillator (NCO). Methods may further comprise combining, using an embedding device, the sub-carrier signal and original carrier signal such that a composite carrier signal results.

Implementations of a method of receiving a sub-carrier signal having reduced probability of detection and interception may comprise receiving, using a receiving device, a composite carrier signal comprising an original carrier signal having a static frequency and a sub-carrier signal, despreading, using a despreader the sub-carrier signal, demodulating,} using a demodulator, the despread sub-carrier signal, and decoding, using a decoder, information received within the demodulated sub-carrier signal using the static frequency of the original carrier signal as a reference to determine a frequency offset of the sub-carrier signal relative to the original carrier signal based on an a priori PRN sequence.

Particular implementations may comprise one or more of the following features. Methods may further comprise receiving, using a static frequency receiver, the original carrier signal. Methods may further comprise decrypting, using a decryption device, the decoded information. Methods may further comprise using a Direct Digital Synthesizer (DDS) or a Number Controlled Oscillator (NCO) to steer the center frequency of the sub-carrier signal relative to a center frequency of the original carrier signal.

Implementations of a method of receiving a sub-carrier signal having reduced probability of detection and interception may comprise receiving, using a receiving device, a composite carrier signal comprising an original carrier signal having a frequency hopping center frequency and a sub-carrier signal, despreading, using a despreader the sub-carrier signal, demodulating, using a demodulator, the despread sub-carrier signal, and decoding, using a decoder, information received within the demodulated sub-carrier signal using the frequency hopping center frequency of the original carrier signal as a reference to determine a frequency offset of the sub-carrier signal relative to the original carrier signal based on an a priori PRN sequence.

Particular implementations may comprise one or more of the following features. Methods may further comprise receiving, using a frequency hopping spread spectrum receiver, the original carrier signal. Methods may further comprise steering the center frequency of the original carrier signal using a Direct Digital Synthesizer (DDS) or a Number Controlled Oscillator (NCO). Methods may further comprise using a Direct Digital Synthesizer (DDS) or a Number Controlled Oscillator (NCO) to steer the center frequency of the sub-carrier signal relative to a center frequency of the original carrier signal. Methods may further comprise decrypting, using a decryption device, the decoded information.

Implementations of a method of receiving a sub-carrier signal having reduced probability of detection and interception may comprise receiving, using a receiving device, a composite carrier signal comprising an original carrier signal having a dithering frequency and a sub-carrier signal, despreading, using a despreader the sub-carrier signal, demodulating, using a demodulator, the despread sub-carrier signal, and decoding, using a decoder, information received within the demodulated sub-carrier signal using the dithering frequency of the original carrier signal as a reference to determine a frequency offset of the sub-carrier signal relative to the original carrier signal based on an a priori PRN sequence.

Particular implementations may comprise one or more of the following features. Methods may further comprise receiving, using a frequency agile receiver, the original carrier signal. Methods may further comprise steering the center frequency of the original carrier signal using a Direct Digital Synthesizer (DDS) or a Number Controlled Oscillator (NCO). Methods may further comprise using a Direct Digital Synthesizer (DDS) or a Number Controlled Oscillator (NCO) to steer the center frequency of the sub-carrier signal relative to a center frequency of the original carrier signal. Methods may further comprise decrypting, using a decryption device, the decoded information.

Implementations of a system for reducing probability of detection and interception of a sub-carrier signal may comprise an encoder that encodes information that is to be transmitted via the sub-carrier signal, a modulator that modulates the encoded information such that a modulated sub-carrier signal results, a spreader that spreads the modulated sub-carrier signal such that a spread sub-carrier signal results, and a transmitting device that transmits the spread sub-carrier signal at a frequency that is dynamic relative to an original carrier signal having a static frequency.

Particular implementations may comprise one or more of the following features. Systems may further comprise an encryption device that encrypts the information prior to encoding. The spreader may use a Pseudo Random Number (PRN) such that the spread sub-carrier signal has a Direct Sequence Spread Spectrum (DSSS). The spreader may use a PRN to randomize a Frequency Hopping Spread Spectrum (FHSS) that results in hopping of a center frequency of the sub-carrier signal. Systems may further comprise a Direct Digital Synthesizer (DDS) or a Number Controlled Oscillator (NCO) that steers the center frequency of the sub-carrier signal relative to a center frequency of the original carrier signal. Systems may further comprise an embedding device that combines the sub-carrier signal and original carrier signal such that a composite carrier signal results.

Implementations of a system of reducing probability of detection and interception of a sub-carrier signal comprising an encoder that encodes information that is to be transmitted via the sub-carrier signal, a modulator that modulates the encoded information such that a modulated sub-carrier signal results, a spreader that spreads the modulated sub-carrier signal such that a spread sub-carrier signal results, and a transmitting device that transmits the spread sub-carrier signal at a frequency that is dynamic relative to an original carrier signal having a dynamic frequency wherein the differential between the frequencies of the sub-carrier signal and original carrier signal is dynamic.

Particular implementations may comprise one or more of the following features. Systems may further comprise an encryption device that encrypts the information prior to encoding. The spreader may use a Pseudo Random Number (PRN) such that the spread sub-carrier signal has a Direct Sequence Spread Spectrum (DSSS). The spreader may use a PRN to randomize a Frequency Hopping Spread Spectrum (FHSS) that results in hopping of a center frequency of the sub-carrier signal. Systems may further comprise a PRN that randomizes a Frequency Hopping Spread Spectrum (FHSS) and results in hopping of a center frequency of the original carrier signal. Systems may further comprise a Direct Digital Synthesizer (DDS) or a Number Controlled Oscillator (NCO) that steers the center frequency of the sub-carrier signal relative to a center frequency of the original carrier signal. Systems may further comprise a Direct Digital Synthesizer (DDS) or a Number Controlled Oscillator (NCO) that steers the center frequency of the original carrier signal. Systems may further comprise an embedding device that combines the sub-carrier signal and original carrier signal such that a composite carrier signal results.

Implementations of a system of reducing probability of detection and interception of a sub-carrier signal may comprise an encoder that encodes information that is to be transmitted via the sub-carrier signal, a modulator that modulates the encoded information such that a modulated sub-carrier signal results, a spreader that spreads the modulated sub-carrier signal such that a spread sub-carrier signal results, and a transmitting device that transmits the spread sub-carrier signal at a frequency that is dynamic relative to an original carrier signal having a dithering frequency movement wherein the differential between the frequencies of the sub-carrier signal and original carrier signal is constant.

Particular implementations may comprise one or more of the following features. Systems may further comprise an encryption device that encrypts the information prior to encoding. The spreader may uses a Pseudo Random Number (PRN) such that the spread sub-carrier signal has a Direct Sequence Spread Spectrum (DSSS). Systems may further comprise a control algorithm that dithers a center frequency of the original carrier signal. The spreader may use a PRN to randomize a Frequency Hopping Spread Spectrum (FHSS) for dithering a center frequency of the sub-carrier signal. Systems may further comprise a Direct Digital Synthesizer (DDS) or a Number Controlled Oscillator (NCO) that steers the center frequency of the original carrier signal. Systems may further comprise a Direct Digital Synthesizer (DDS) or a Number Controlled Oscillator (NCO) that steers the center frequency of the sub-carrier signal relative to a center frequency of the original carrier signal using a Direct Digital Synthesizer (DDS) or a Number Controlled Oscillator (NCO). Systems may further comprise an embedding device that combines the sub-carrier signal and original carrier signal such that a composite carrier signal results.

Implementations of a system for receiving a sub-carrier signal having reduced probability of detection and interception may comprise a receiving device that receives a composite carrier signal comprising an original carrier signal having a static frequency and a sub-carrier signal, a despreader that despreads the sub-carrier signal, a demodulator that demodulates the despread sub-carrier signal, and a decoder that decodes information received within the demodulated sub-carrier signal using the static frequency of the original carrier signal as a reference to determine a frequency offset of the sub-carrier signal relative to the original carrier signal based on an a priori PRN sequence.

Particular implementations may comprise one or more of the following features. Systems may further comprise a static frequency receiver that receives the original carrier signal. Systems may further comprise a decryption device that decrypts the decoded information. Systems may further comprise a Direct Digital Synthesizer (DDS) or a Number Controlled Oscillator (NCO) that steers the center frequency of the sub-carrier signal relative to a center frequency of the original carrier signal.

Implementations of a system for receiving a sub-carrier signal having reduced probability of detection and interception may comprise a receiving device that receives a composite carrier signal comprising an original carrier signal having a static frequency and a sub-carrier signal, a despreader that despreads the sub-carrier signal, a demodulator that demodulates the despread sub-carrier signal, and a decoder that decodes information received within the demodulated sub-carrier signal using the frequency hopping center frequency of the original carrier signal as a reference to determine a frequency offset of the sub-carrier signal relative to the original carrier signal based on an a priori PRN sequence.

Particular implementations may comprise one or more of the following features. Systems may further comprise a frequency hopping spread spectrum receiver that receives the original carrier signal. Systems may further comprise a Direct Digital Synthesizer (DDS) or a Number Controlled Oscillator (NCO) that steers the center frequency of the original carrier signal. Systems may further comprise a Direct Digital Synthesizer (DDS) or a Number Controlled Oscillator (NCO) that steers the center frequency of the sub-carrier signal relative to a center frequency of the original carrier signal. Systems may further comprise a decryption device that decrypts the decoded information.

Implementations of a system for receiving a sub-carrier signal having reduced probability of detection and interception may comprise a receiving device that receives a composite carrier signal comprising an original carrier signal having a static frequency and a sub-carrier signal, a despreader that despreads the sub-carrier signal, a demodulator that demodulates the despread sub-carrier signal, and a decoder that decodes information received within the demodulated sub-carrier signal using the dithering frequency of the original carrier signal as a reference to determine a frequency offset of the sub-carrier signal relative to the original carrier signal based on an a priori PRN sequence.

Particular implementations may comprise one or more of the following features. Systems may further comprise a frequency agile receiver that receives the original carrier signal. Systems may further comprise a Direct Digital Synthesizer (DDS) or a Number Controlled Oscillator (NCO) that steers the center frequency of the original carrier signal. Systems may further comprise a Direct Digital Synthesizer (DDS) or a Number Controlled Oscillator (NCO) that steers the center frequency of the sub-carrier signal relative to a center frequency of the original carrier signal. Systems may further comprise a decryption device that decrypts the decoded information.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Description, Drawings, or Claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the claimed disclosure, the claims will specifically and expressly state the exact phrases "means for" or "step for," and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed disclosure, it is intended that the disclosure not be limited only to the specific structure, material or acts that are described in the preferred embodiments, but in addition, include any and all structures, materials or acts that perform the claimed function as described in alternative embodiments or forms of the invention, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

Figure 1:
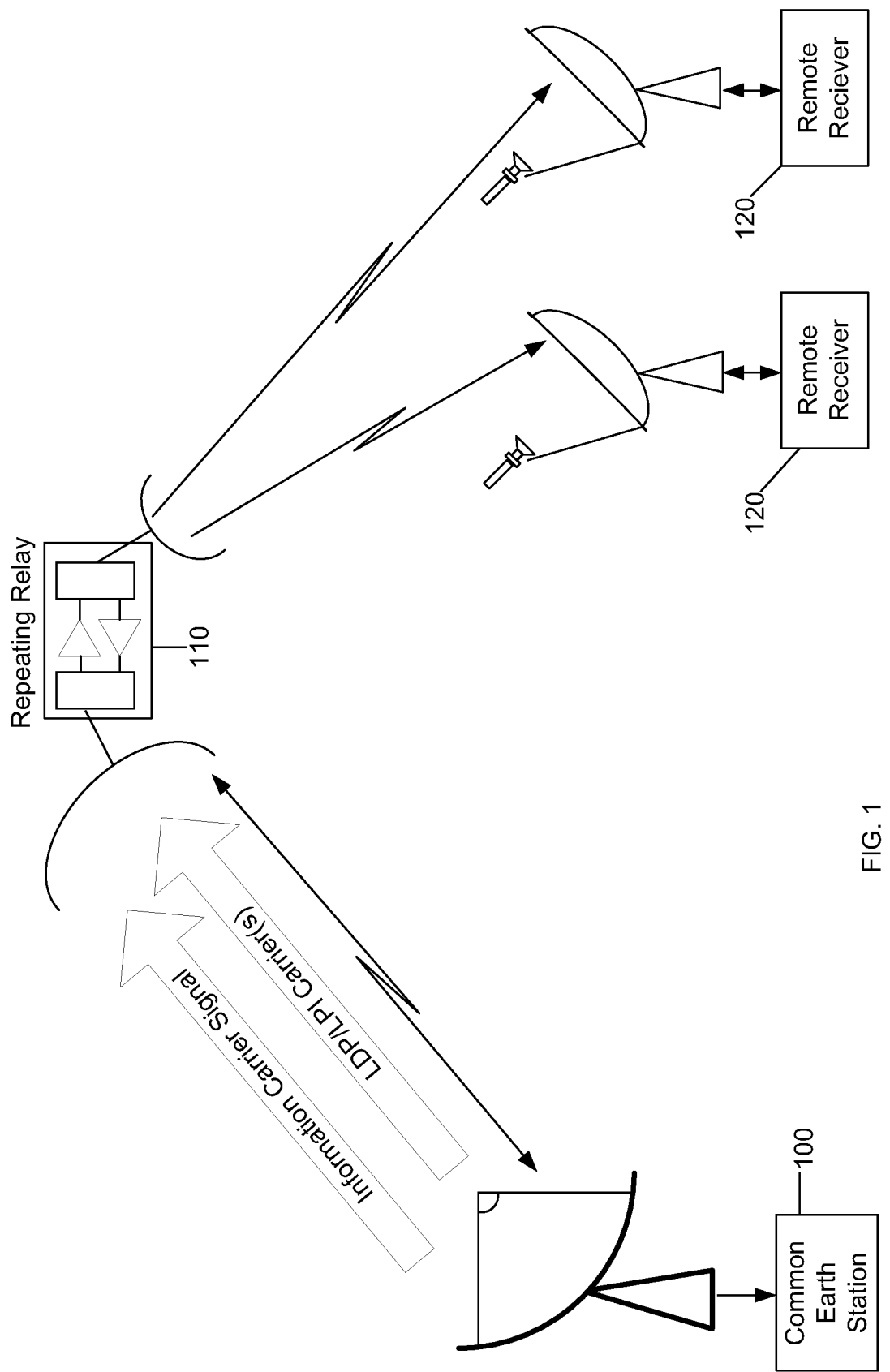
FIG. 1 depicts an implementation of a transmission network having an earth station and remote stations and using an airborne or space-based repeating relay.

This disclosure, its aspects and implementations, are not limited to the specific components, frequency examples, or methods disclosed herein. Many additional components and assembly procedures known in the art consistent with the secure transmission of information using multiple low-probability of detection (LPD) and low-probability of interception (LPI) secondary carriers under a primary carrier with relative carrier offset are in use with particular implementations will become apparent from this disclosure. Accordingly, for example, although particular implementations are disclosed, such implementations and implementing components may comprise any components, models, versions, quantities, and/or the like as is known in the art for such systems and implementing components, consistent with the intended operation.

This disclosure relates to a method of providing a transmission path for a primary information carrier with one or more LPD/LPI channels. More specifically, this disclosure relates to a method for the secure transmission of information using multiple low-probability of detection (LPD) and low-probability of interception (LPI) secondary channel(s) under a primary carrier with relative carrier offset for use with electromagnetic (EM) communications devices.

Communications paths may be secured using common methods of encryption, but encryption only addresses the obfuscation of the data and possibly authentication, and does not address LPD and LPI. This disclosure ensures the communications path is secure using Transmission Security (TRANSEC) techniques for secured communications links using the same Radio Frequency (RF) spectrum for transmission to mask the traffic load, obfuscate the traffic, lower the probability of detection, lower the probability of interception and provide a system for authentication. The methods disclosed herein may therefore provide a low bit rate channel that may be utilized to provide a transmission path for multiple independent levels of security (MILS) systems.

The disclosure outlines a single block of spectrum that may be used for the transmission of user information known as the "information carrier" signal from one or more transmitting locations to one or more receiving locations (i.e. point-to-point, point-to-multi-point, multi-point to multi-point electromagnetic (EM) communications devices). Providing a communications path that is reliable, yet secure, can be challenging. Conventional systems use a variety of approaches for ensuring a communications path is secure using Transmission Security (TRANSEC) techniques to mask the traffic load, obfuscate the traffic, lower the probability of detection, lower the probability of interception and provide an approach for authentication. Some methods disclosed herein provide a TRANSEC solution that may be used in a secure communications link using the same Radio Frequency (RF) spectrum for transmission of the primary information channel and the secondary TRANSEC channel or channels. The methods disclosed herein address all areas of concern for a TRANSEC compliant communications system. This disclosure also describes several embodiments for transmitting an information carrier and a separate LPD/LPI channel for cryptographic keying material and/or sensitive information in the same block of transmission spectrum.

This disclosure relates to methods for the secure transmission of information using one or more hybrid direct sequence spread spectrum (DSSS) and frequency hopping spread spectrum (FHSS) secondary channels that reside under the relative noise floor of a primary transmission source that employs relative carrier offset. The relative carrier offset characteristics of the primary information channel bring an LPI aspect to the primary channel which adds to the security of the hybrid DSSS/FHSS secondary channel.

The ability to support several hybrid DSSS/FHSS secondary channels allows the communications system to support multiple independent levels of security (MILS) to each of the various remotes at the same time. For example, a transmitting device in a point to multi-point application may utilize the LPD/LPI secondary channel to transfer cryptographic keying material for the primary information channel and/or transfer sensitive data to each remote receiver that is encrypted using a different key or cryptographic algorithm. The cryptographic keying information may be, but is not limited to, over the air rekey (OTAR) information, crypto-variables (CV), initialization variables (IV), seed(s) for the DSSS algorithm, seed(s) for the FHSS algorithm, seed for the primary carrier dithering algorithm, command/control information for each remotes receiver's cryptographic algorithms, or other system specific control.

The techniques described in this disclosure provide solutions for securing the primary information carrier and the LPD/LPI distribution of cryptographic keying material and/or sensitive information via a secondary channel. Throughout this disclosure, the term "LPD/LPI channel" is synonymous with a secondary channel for distributing cryptographic keying material and/or sensitive information. In all embodiments, the "LPD/LPI channel" may be physically separate from the information channel in, but not limited to, frequency, modulation, symbol rate, chip rate, spreading factor, scrambling, encryption, and the like.

Particular implementations of secure transmission of information using multiple low-probability of detection (LPD) and low-probability of interception (LPI) secondary carriers under a primary carrier with relative carrier offset disclosed herein may be specifically employed in satellite communications systems. However, as will be clear to those of ordinary skill in the art from this disclosure, the principles and aspects disclosed herein may readily be applied to any electromagnetic (IF, RF and optical) communications system, such as cellular phone network or terrestrial broadcast without undue experimentation.

In all embodiments, the information carrier and the LPD/LPI channel may be encrypted to address the obfuscation of the data and all carriers may remain in an active state (constant transmission) addressing the masking of user traffic. The act of moving the information carrier addresses LPI on both the primary and secondary channel(s), and the act of spreading and moving the LPD/LPI carrier addresses both LPD and LPI on the secondary channel(s).

This disclosure relates to methods that can be employed for an EM emitting device, RF transmission equipment for point-to-point, point-to-multipoint and/or multipoint-to-multipoint communication system as shown in the example provided in FIG. 1. For example, in a particular embodiment, FIG. 1 illustrates an example of a method implemented over a satellite communications transmission network comprising a common earth station 100 where information is aggregated and prepared for transmission and transmitted to a space-based repeating relay 110, such as that illustrated in FIG. 2, using common satellite based RF frequencies. Once received at the space-based repeating relay 110, the transmission is then relayed back to a remote receiving station 120. As is illustrated in FIGS. 1-2, the methods are open to any receiving device that may be capable of intercepting transmission to or from the space-based repeating device 110.

Figure 2:
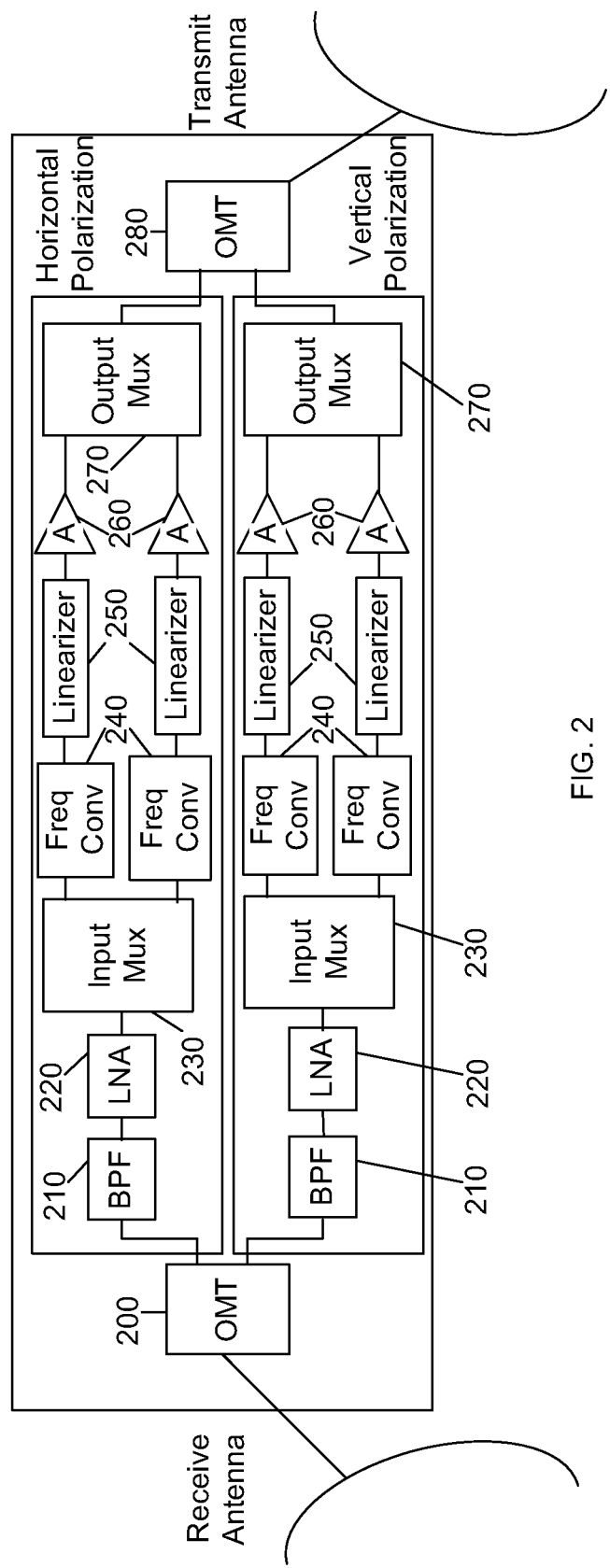
FIG. 2 is a block diagram of an implementation of an airborne or space-based repeating relay.

FIG. 2 depicts an example of a configuration of a repeating relay. The repeating relay station receives a transmission at an ingress Orthogonal Mode Transducer (OMT) 200 and relays the polarized transmission to the destination which then directs the output such that the carrier signal(s) is then band-pass filtered 210, amplified 220, and separated in frequency by an input multiplexer 230. The signal may be linearized 250, amplified 260 and up- or down-converted 240 before passing through an output multiplexer 270 and an egress OMT 280 from which the carrier signal(s) is sent to the transmit antenna for relay.

The information to be transmitted may originate at the common earth station 100 or be "back-hauled" via a terrestrial, microwave or satellite connection to the common earth station 100 to be remotely uplinked to the space-based repeating device 110. To provide Transmission Security (TRANSEC) for present and future communications systems, the following areas should be addressed. The following information will be referred to throughout this disclosure as TRANSEC-1 through TRANSEC-5:

TRANSEC-1: Masking Traffic Flow.

This concept is natively addressed in a satellite communications network because the carrier is always on and null or dummy traffic is always flowing even when data is not available for transmission.

TRANSEC-2: Obfuscate Traffic Data.

This concept is addressed via bulk encryption of the information payload including headers to mask the source or destination in an IP network. Theoretically, the entire outbound signal including the physical medium headers, (i.e. frame header) should be encrypted because an enemy could use the information to deduce general location or destination.

TRANSEC-3: LPD.

This concept is addressed by the described method because the LPD/LPI carrier is buried under the noise floor.

TRANSEC-4: LPI.

This concept is addressed by the described method because the information carrier signal and the LPD/LPI carrier are dynamically moved in frequency.

TRANSEC-5: Authentication.

This concept is typically addressed via the COMSEC solution (i.e. Hash, digital signatures and the like).

The output of the modulating equipment located in the common earth station contains a single constant modulated information carrier signal $x_{info}(t)=A_I \cos(\omega_c t)+A_Q \sin(\omega_c t)$, represented as $X_{info}$, thus addressing TRANSEC-1. The information provided to the modulating equipment may be bulk encrypted, addressing requirement TRANSEC-2 and TRANSEC-5. Both TRANSEC-1 and TRANSEC-2 have been addressed through all embodiments in this disclosure.

In all embodiments, an information carrier $X_{info}$ is combined with one or more LPD/LPI carrier(s), $c_{LPD/LPI}(t)=B_I \cos(\omega'_c t+\phi_c)+B_Q \sin(\omega'_c t+\phi_c)$, as represented as $C_{LPD/LPI}$ prior to being spread. In one particular non-limiting embodiment Binary Phase Shift Keying (BPSK) may be the modulation scheme of the LPD/LPI carrier(s), however, one of ordinary skill in the art would recognize that any appropriate modulation format may be used. Once the LPD/LPI carrier(s) are spread or chipped, the waveform may be the spread LPD/LPI carrier(s) and represented as $cs_{LPD/LPI}(t)=Bchipped_I \cos(\omega_c't+\phi_c)+Bchipped_Q \sin(\omega_c't+\phi_c)$ as represented as $CS_{LPD/LPI}$. As one skilled in the art would understand, the LPD/LPI carrier(s) is then combined with the original (primary) carrier signal to create a composite carrier signal also shown in FIGS. 3-5 as $Z_{composite}=X_{info}+CS_{LPD/LPI}$.

Figure 6:
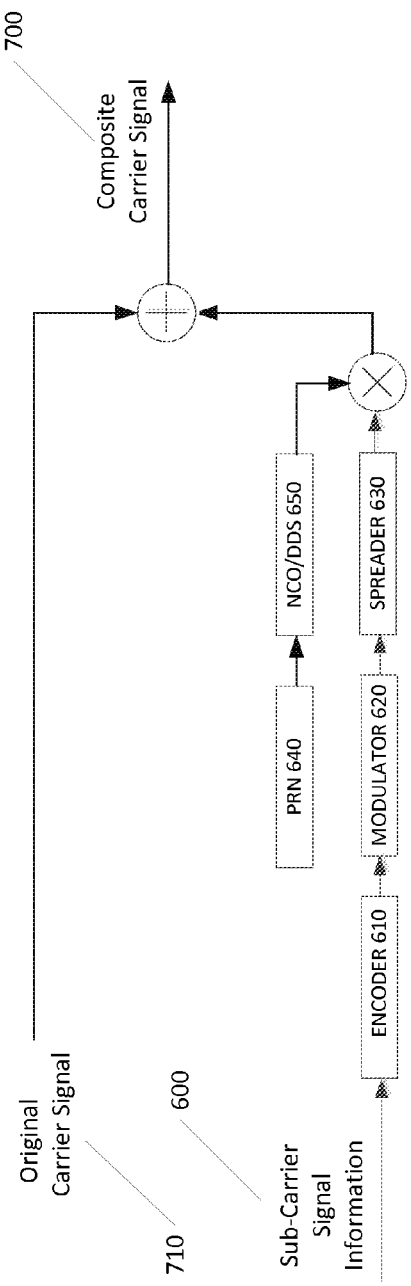
FIGS. 6-7 are block diagrams of an implementation of a system for reducing probability detection and interception of a sub-carrier signal.
Figure 7:
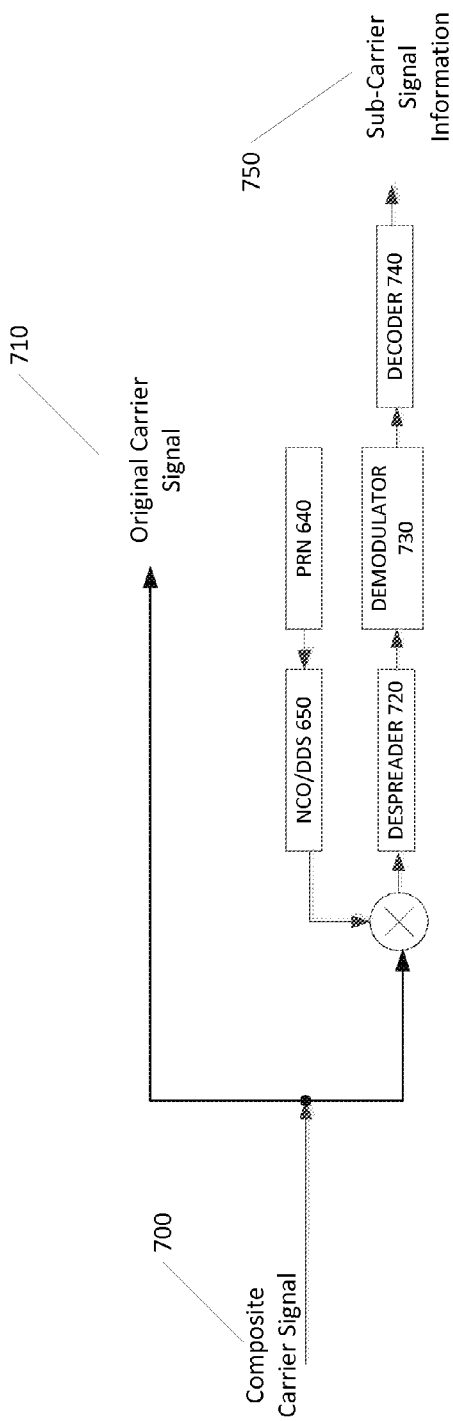

As shown in FIGS. 6-7, in some implementations, sub-carrier signal information 600 is encoded with an encoder 610, modulated using a modulator 620 and spread using a spreader 630. A Pseudo-Random Number Sequence Generator 640 may be used with a Numerically Controlled Oscillator (NCO) or Direct Digital Synthesizer (DDS) 650 to alter the frequency of the sub-carrier signal. The spread and frequency-altered sub-carrier signal is the combined with an original carrier signal 710 to form a composite carrier signal 700 for transmission. On the receiving side, the composite carrier signal 700 is split into the original carrier signal 710 and the sub-carrier signal, which is despread using a despreader 720, demodulated using a demodulator 730, and decoded using a decoder 740 to extract the sub-carrier signal information 750.

In one embodiment, the information carrier's center frequency is set to a single frequency and may be bulk encrypted, and one or more LPD/LPI channels may be spread and transmitted in the same block of transmission spectrum as the information carrier signal, outside, partially, or completely under the information carrier signal. The frequency of the LPD/LPI carrier may, but is not required to, be relative to the information carrier signal, and may be spread using a spread spectrum technique such as Direct Sequence Spread Spectrum (DSSS). The LPD/LPI carrier may be moved dynamically in frequency relative to information carrier signal. The LPD/LPI carrier may be dynamically moved in frequency to predetermined frequency bins based on the a priori PRN sequence used by both the transmitting and receiving devices. Spreading the LPD/LPI channel makes detection difficult, thus addressing LPD. Moving the LPD/LPI carrier in frequency makes tracking difficult, thus addressing the LPI. In this particular embodiment, the information carrier's center frequency remains fixed.

Figure 3:
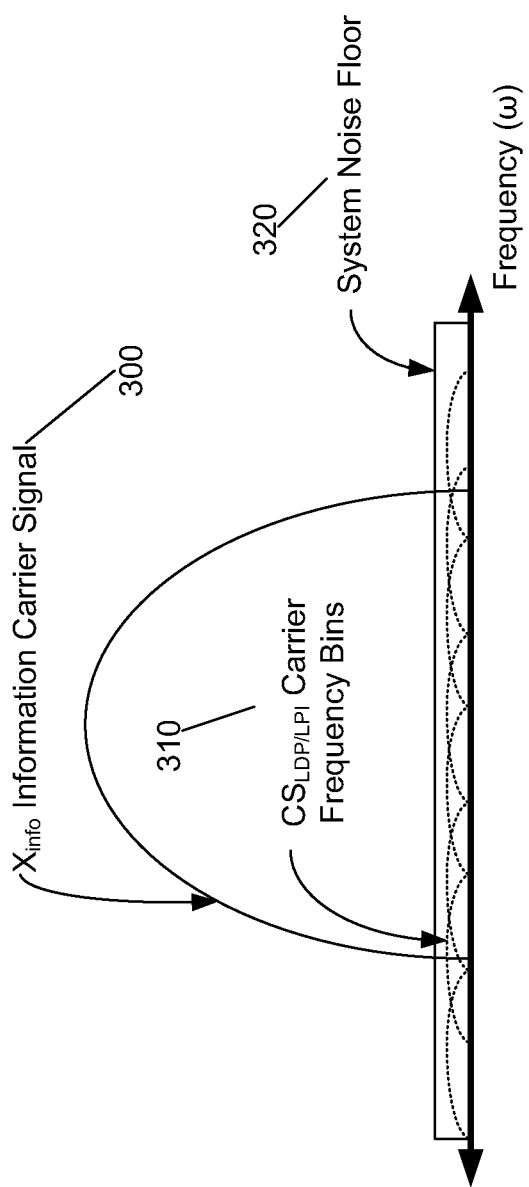
FIG. 3 is a diagram of a frequency spectrum of a fixed information carrier with a dynamic LPD/LPI channel.

As illustrated by the example in FIG. 3, when the LPD/LPI carrier(s) are outside, partially or completely under the information carrier signal, knowing the energy of the signal to noise density of the original carrier, $X_{info}$ (Es/No) of $X_{info}$, and knowing the processing gain $G_p$ of a LPD/LPI carrier that has been chipped, $CS_{LPD/LPI}$, is 10 Log($CS_{LPD/LPI}$/Data$_{LPD/LPI}$), where the $CS_{LPD/LPI}$ is the chipped bandwidth of the LPD/LPI carrier and the Data$_{LPD/LPI}$ is the bandwidth of the data contained in the LPD/LPI channel. The spreading of the LPD/LPI channel results in a carrier signal that operates below the system noise floor and thus addresses TRANSEC-3. The result is a signal that has been chipped by tens, hundreds, thousands, or even millions of times. For example, assuming that the LPD/LPI channel information is 100 bits per second (bps) and the chip rate of $CS_{LPD/LPI}$ is 10 Mcps using a spread factor of 100,000, this may be expressed in Decibels (dB) as 10 Log(100,000)=40.0 dB. As another example, if we assume that the LPD/LPI channel is 100 bits per second (bps) and the chip rate is 5 Mcps using a spread factor of 50,000, this may be expressed in Decibels (dB) as 10 Log(50,000)=46.9 dB. The processing gain of the $CS_{LPD/LPI}$ enables the separation of the combined $X_{info}$ carrier by considering $X_{info}$ as a noise carrier when $CS_{LPD/LPI}$ is either partially or completely under $X_{info}$.

FIG. 3 demonstrates an embodiment of a fixed-frequency information carrier signal 300, and LPD/LPI secondary channel(s) 310 that may be moved relative to the information carrier signal 300 in a random fashion based on, but not limited to, a PRN sequence such that a receiving device may receive and decode the LPD/LPI carrier(s). More specifically, in this embodiment, the center frequency $\omega_c$ of $x_{info}(t)=A_I \cos(\omega_c t)+A_Q \sin(\omega_c t)$ as represented as $X_{info}$ 300 remains fixed, and the frequency offset $\omega_c'$ of the $c_{LPD/LPI}(t)=B_I \cos(\omega_c' t+\phi_c)+B_Q \sin(\omega_c' t+\phi_c)$, as represented as $CS_{LPD/LPI}$ and is dynamic over a pre-configured number of frequency bins 310 relative to the information carrier signal's $X_{info}$ 300 center frequency $\omega_c$. The relative frequency of $\omega_c'$ (for $CS_{LPD/LPI}$) away from $\omega_c$ (for $X_{info}$), may be defined in terms of linear or non-liner distance (in frequency) as a function of the algorithm that is used to define the placement of the frequency bin 310. Given that the information carrier signal $X_{info}$ 300 is stationary in frequency, the LPD/LPI channel(s) $CS_{LPD/LPI}$ 310 may be stationary or moved at a predetermined rate that would be known only to the transmitter and the receiver. The rate and placement of the LPD/LPI channel(s) 310 may be controlled by a PRN sequence or any known algorithm that is known by the transmitter and receiver or receivers. The movement of the LPD/LPI channel(s) 310 addresses TRANSEC-4.

The LPD/LPI carrier(s) is spread to a level that places it below the noise floor 320 thus, making detection difficult. This addresses the LPD aspect, and the constant movement of the secondary carrier(s) relative to the information carrier makes predicting the precise location of the carrier(s) highly challenging, which addresses the LPI requirements.

This disclosure further includes a method for synchronizing the transmitter to the receiver and addressing TRANSEC-5. During operation, unforeseen circumstances may occur, such as power outages, sun outages, rain fade, equipment failure, and the like, that may result in the transmitter and receiver losing synchronization with one another. In order to re-synchronize the transmitter to the receiver, a periodic normalization may be done. During this time an authentication message may be sent to the remote. The normalization is a period during which the transmitter sends a message that includes, but is not limited to, the current frequency, code, modulation, cryptographic algorithm, CV, IV, authentication message, other pertinent system/cryptographic information, and the like. In the event the receiver loses synchronization, the receiver may extract all system critical information via the secondary channel. After the transmitter has dwelled for the required synchronization state (normalization) time, the transmitter then resumes moving the LPD/LPI channel.

In another embodiment, the information carrier's center frequency is "hopped" and may be bulk encrypted, and one or more LPD/LPI channels may be spread and transmitted in the same block of transmission spectrum as the information carrier signal, outside the information carrier signal, partially under the information carrier signal, or completely under the information carrier signal. The information carrier's frequency may, but is not required to, be changed to a pre-set number of frequencies over a given range or preset bins and controlled by a PRN sequence. This may be accomplished by steering the information carrier signal's center frequency with a Direct Digital Synthesizer (DDS) or Numerically Controlled Oscillator (NCO). The frequency of the LPD/LPI carrier may be relative to the main carrier and may be spread using a spread spectrum technique such as Direct Sequence Spread Spectrum (DSSS). The LPD/LPI carrier may be moved dynamically in frequency relative to information carrier resulting in the LPD/LPI carrier moving as a result of the information carrier changing frequency and additionally, the LPD/LPI carrier's frequency bin may be changed, thus resulting in the relative distance (in frequency) between the information carrier the LPD/LPI carrier being a second moment of movement. By hopping the information carrier, LPI is addressed. Spreading the LPD/LPI channel makes detection difficult, thus addressing LPD. Moving the LPD/LPI carrier makes tracking difficult, thus addressing the LPI. In this particular embodiment, the information carrier's center frequency is dynamic (hopped in frequency).

Figure 4:
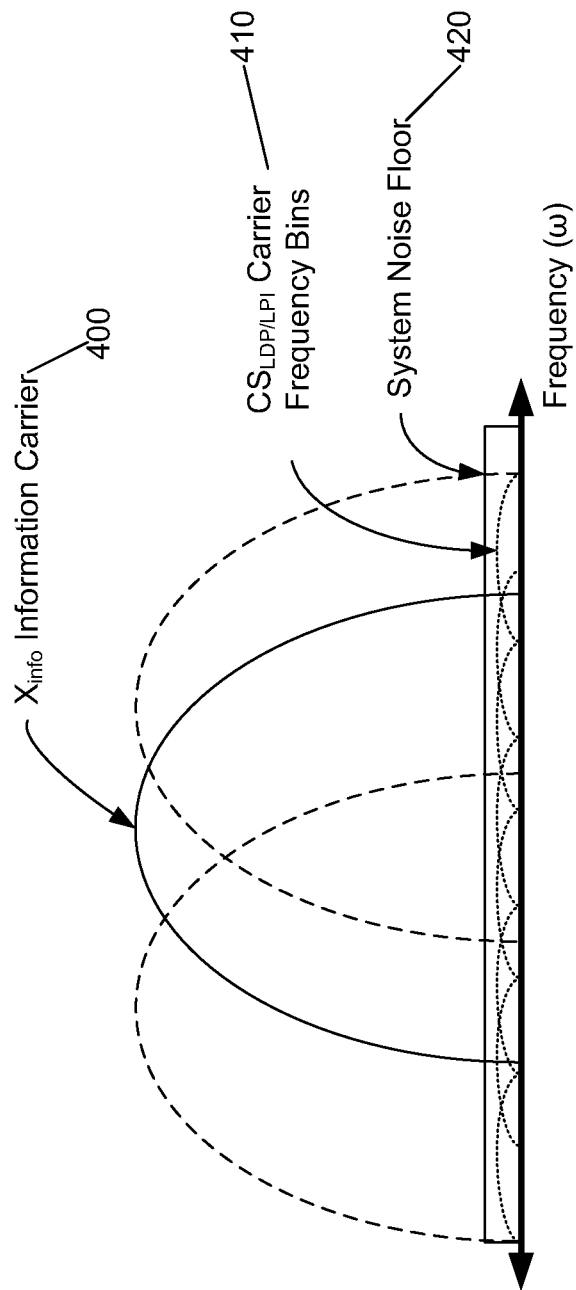
FIG. 4 is a diagram of a frequency spectrum of a dynamic "hopped" information carrier with a dynamic LPD/LPI channel.

FIG. 4 depicts an embodiment in which the information carrier signal 400 is moved or "hopped" in frequency and LPD/LPI carrier(s) 410 are used to carry sensitive information and/or cryptographic keying information thereby providing additional improvement for TRANSEC-3. The operation of the hopped information carrier 400 remains the same as the operation as shown in FIG. 3 with the exception that $\omega_c$ is hopped over pre-determined frequencies in a manner that may be followed by the receiver or receivers. The hopping may be controlled by adjusting a Direct Digital Synthesizer (DDS) or Numerically Controlled Oscillator (NCO) in a manner that hops from one frequency to another. Since the hopping steps are controlled by, but not limited to, a PRN sequence, tracking or predicting the next operating frequency may be difficult for a non-authorized receiving device. The resulting hopping effect may cause a non-authorized receiver to have difficulty in tracking the carrier as a result of operating outside the first-order tracking loop (or phase-locked loop), since the information carrier signal 400 is moving in frequency at a rate that is beyond the receivers' mode of operation in conventional systems. The operation of the LPD/LPI carrier may or may not be placed under the information carrier signal. This particular embodiment provides one level of moment for the information carrier signal 400, since the carrier may be hopped to various operational frequencies, but two levels of moment for the LPD/LPI carrier(s) 410, since the relative frequency between the information carrier and LPD/LPI carrier(s) changes, $\omega_c'$ (for $CS_{LPD/LPI}$), away from $\omega_c$ (for $X_{info}$) as a first moment of movement, and the center frequency of the information carrier signal's relative offset from the carrier, $\omega_c$ (for $X_{info}$), is moving as a second moment of movement.

The fact that the LPD/LPI carrier(s) 410 is spread to a level that places it below the noise floor 420 makes detection difficult, addressing the LPD aspect. However, the constant movement of both the information carrier signal 400 and the LPD/LPI carrier(s) 410 relative to the information carrier signal 400 makes predicting the precise location of both the primary carrier and secondary carrier(s) extremely challenging, and addresses the LPI requirements.

In yet another embodiment, the information carrier signal's center frequency is "swept" or "dithered" and may be bulk encrypted, and one or more LPD/LPI channels may be spread and transmitted in the same block of transmission spectrum as the information carrier signal, outside the information carrier signal, partially under the information carrier signal, or completely under the information carrier signal. The information carrier's center frequency may be changed by "dithering" the frequencies over a given range. This may, but is not required to, be accomplished by steering the information carrier signal's center frequencies with a DDS or NCO. The frequency of the LPD/LPI carrier may be relative to the main carrier, and may be spread using a spread spectrum technique such as Direct Sequence Spread Spectrum (DSSS). The LPD/LPI carrier may be moved dynamically in frequency relative to the information carrier resulting in the LPD/LPI carrier moving as a result of the information carrier changing frequency and additionally, the LPD/LPI carrier's frequency bin may be changed, being the first moment of movement, thus resulting in the relative distance (in frequency) between the information carrier the LPD/LPI carrier being a second moment of movement. By "dithering" the information carrier, LPI is addressed in the primary information carrier. Spreading the LPD/LPI channel makes detection difficult, thus addressing LPD. Moving the LPD/LPI carrier in frequency makes tracking difficult, thus addressing the LPI. In this particular embodiment, the information carrier's center frequency is dynamic (dithered).

Figure 5:
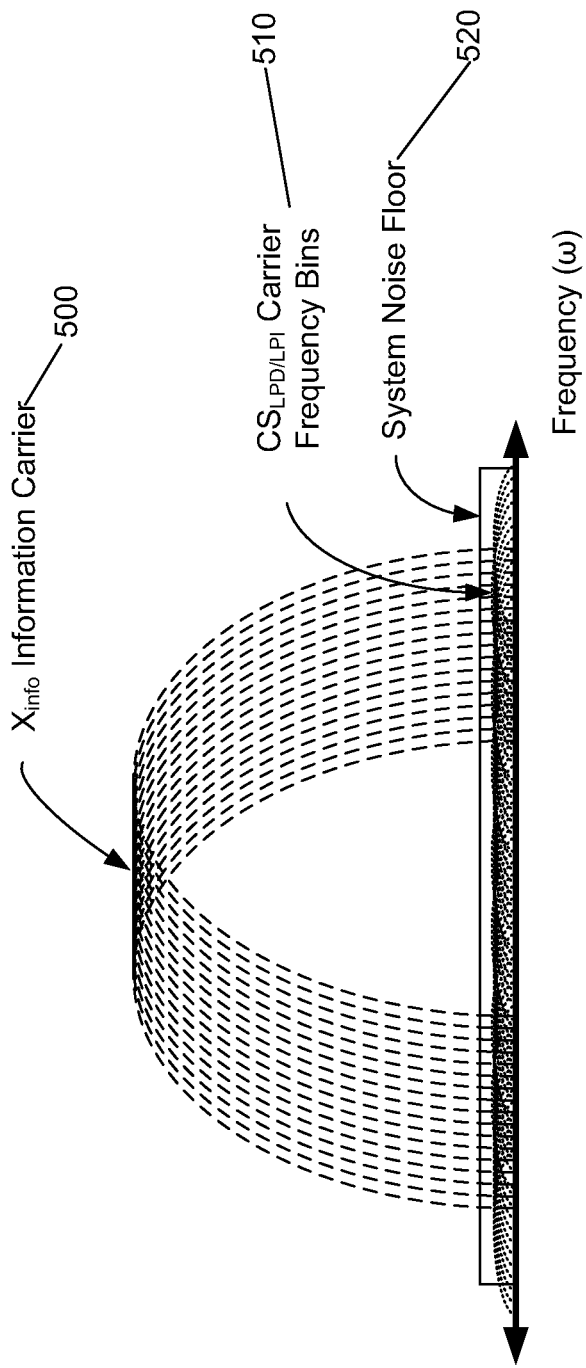
FIG. 5 is a diagram of a frequency spectrum of a dynamic "dithered" information carrier with a dynamic LPD/LPI channel.

FIG. 5 depicts an embodiment where the information carrier signal 500 is dynamically "dithered" in frequency, and LPD/LPI carrier(s) 510 are used to transmit sensitive information and/or cryptographic keying information to provide additional improvement for TRANSEC-3. The LPD/LPI carrier(s) 510 may be moved relative to the information carrier (swept and hopped) in a random fashion based on, but not limited to a PRN sequence, so a receiving device may decode the LPD/LPI carrier. The operation of the dithered information carrier signal 500 remains the same as the operation as shown in FIG. 3 with the exception that $\omega_c$ (for $X_{info}$) is dithered over pre-determined frequencies in a manner that may be followed by the remote receiver or receivers. The dithering may be controlled by adjusting a DDS or NCO in a manner that appears to move or sweep the reference of the system. The resulting sweeping effect may cause a non-authorized receiver to have difficulty in tracking the carrier as a result of operating outside the first-order tracking loop (or phase-locked loop), since the information carrier 500 is moving in frequency at a rate that is beyond the receivers' mode of operation in the existing art. The operation of the LPD/LPI carrier(s) 510 may or may not be placed under the information carrier signal (500). This particular embodiment provides one level of moment for the information carrier, since the information carrier signal 500 may be dithered to various operational frequencies, but provides two levels of moment for the LPD/LPI channel(s) 510, since the relative frequency between the information and LPD/LPI carrier(s) change, $\omega_c'$ (for $CS_{LPD/LPI}$) away from $\omega_c$ (for $X_{info}$) as a first moment of movement and the relative offset of the center frequency from the information carrier, $\omega_c$ (for $X_{info}$), is moving as a second moment of movement.

The fact that the LPD/LPI carrier(s) are spread to a level that places them below the noise floor 520 makes detection difficult, addressing the LPD aspect. However, the constant movement of both the information carrier 500 and the LPD/LPI carrier(s) 510 relative to the information carrier makes predicting the precise location of the carrier extremely challenging, and addresses the LPI requirements.

Particularly unique to this disclosure are the techniques of moving (hopping or dithering in frequency) the information carrier making interception difficult (LPI), spreading the LPD/LPI channel(s)' energy to a low level such that detection is difficult (LPD), and moving the carrier in a dynamic fashion (dithering in frequency) makes receiving and decoding the secondary channel extremely challenging, and addresses both LPD and LPI requirements.

The following non-limiting examples are intended to provide exemplary implementations of the system and methods disclosed herein and not intended to limit the scope of this disclosure as such:

Example 1

A satellite earth station may be configured to operate at an assigned allocated bandwidth for transmission to a satellite repeating relay at a geo-equatorial location. Information is first bulk encrypted and modulated using a constant carrier transmission method for the information carrier. One LPD/LPI channel may carry cryptographic keying information and/or sensitive information is completely under the information carrier and is encrypted, modulated, spread and transmitted using a constant carrier transmission method. For this example, the earth station transmits the information carrier signal at a single frequency. The LPD/LPI channel is combined with the information carrier signal and the center frequency of the information channel is used as a reference for transmission. The LPD/LPI channel is moved to the designated frequency bins relative to the information carrier's center frequency in a manner that would only be known to the transmitter and receiver or receivers.

Example 2

In particular implementations of the system described in Example 1, a satellite earth station is configured to operate at an assigned allocated bandwidth for transmission to a satellite repeating relay at a geo-equatorial location. Information is first bulk encrypted and modulated using a constant carrier transmission method for the information carrier. One LPD/LPI channel may carry cryptographic keying information and/or sensitive information is partially under the information carrier and is encrypted, modulated, spread and transmitted using a constant carrier transmission method. For this example, the earth station transmits the information carrier at a single frequency. The LPD/LPI channel is combined with the information carrier and the center frequency of the information channel is used as a reference for transmission. The LPD/LPI channel is moved to the designated frequency bins relative to the information carrier's center frequency in a manner that would only be known to the transmitter and receiver or receivers.

Example 3

In particular implementations of the system described in Example 1, a satellite earth station is configured to operate at an assigned allocated bandwidth for transmission to a satellite repeating relay at a geo-equatorial location. Information is first bulk encrypted and modulated using a constant carrier transmission method for the information carrier. One LPD/LPI channel may carry cryptographic keying information and/or sensitive information is not under the information carrier and is encrypted, modulated, spread and transmitted using a constant carrier transmission method. For this example, the earth station transmits the information carrier at a single frequency. The LPD/LPI channel is combined with the information carrier and the center frequency of the information channel is used as a reference for transmission. The LPD/LPI channel is moved to the designated frequency bins relative to the information carrier's center frequency in a manner that would only be known to the transmitter and receiver or receivers.

Example 4

A satellite earth station may be configured to operate at an assigned allocated bandwidth for transmission to a satellite repeating relay at a geo-equatorial location. Information is first bulk encrypted and modulated using a constant carrier transmission method for the information carrier. Multiple LPD/LPI channels that may carry cryptographic keying information and/or sensitive are completely under the information carrier and information is encrypted, modulated, spread and transmitted using a constant carrier transmission method. For this example, the earth station transmits the information carrier signal at a single frequency. The LPD/LPI channels are combined with the information carrier signal and the center frequency of the information channel is used as a reference for transmission. The LPD/LPI channel is moved to the designated frequency bins relative to the information carrier's center frequency in a manner that would only be known to the transmitter and receivers.

Example 5

In particular implementations of the system described in Example 4, a satellite earth station is configured to operate at an assigned allocated bandwidth for transmission to a satellite repeating relay at a geo-equatorial location. Information is first bulk encrypted and modulated using a constant carrier transmission method for the information carrier. Multiple LPD/LPI channels that may carry cryptographic keying information and/or sensitive information is partially under the information carrier and is encrypted, modulated, spread and transmitted using a constant carrier transmission method. For this example, the earth station transmits the information carrier signal at a single frequency. The LPD/LPI channels are combined with the information carrier and the center frequency of the information channel is used as a reference for transmission. The LPD/LPI channel is moved to the designated frequency bins relative to the information carrier's center frequency in a manner that would only be known to the transmitter and receivers.

Example 6

In particular implementations of the system described in Example 4, satellite earth station is configured to operate at an assigned allocated bandwidth for transmission to a satellite repeating relay at a geo-equatorial location. Information is first bulk encrypted and modulated using a constant carrier transmission method for the information carrier. Multiple LPD/LPI channels that may carry cryptographic keying information and/or sensitive information is not under the information carrier signal and is encrypted, modulated, spread and transmitted using a constant carrier transmission method. For this example, the earth station transmits the information carrier signal at a single frequency. The LPD/LPI channels are combined with the information carrier signal and the center frequency of the information channel is used as a reference for transmission. The LPD/LPI channel is moved to the designated frequency bins relative to the information carrier's center frequency in a manner that would only be known to the transmitter and receivers.

Example 7

A satellite earth station may be configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. A single LPD/LPI channel may carry cryptographic keying information and/or sensitive information is completely under the information carrier signal and is encrypted, modulated, spread and transmitted using a constant carrier transmission method. For this example, the earth station transmits the information carrier signal over a various frequencies in a frequency hopping manner. The LPD/LPI channel is combined with the information carrier signal and the center frequency of the information channel is used as a reference for transmission. The LPD/LPI channel is moved to the designated frequency bins relative to the information carrier's center frequency in a manner that would only be known to the transmitter and receiver or receivers.

Example 8

In particular implementations of the system described in Example 7, a satellite earth station is configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. A single LPD/LPI channel may carry cryptographic keying information and/or sensitive information partially under the information carrier and is encrypted, modulated, spread and transmitted using a constant carrier transmission method. For this example, the earth station transmits the information carrier signal over a various frequencies in a frequency hopping manner. The LPD/LPI channel is combined with information carrier signal and the center frequency of the information channel is used as a reference for transmission. The LPD/LPI channel is moved to the designated frequency bins relative to the information carrier's center frequency in a manner that would only be known to the transmitter and receiver or receivers.

Example 9

In particular implementations of the system described in Example 7, a satellite earth station is configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. A single LPD/LPI channel may carry cryptographic keying information and/or sensitive information not under the information carrier is encrypted, modulated, spread and transmitted using a constant carrier transmission method. For this example, the earth station transmits the information carrier signal over a various frequencies in a frequency hopping manner. The LPD/LPI channel is combined with information carrier signal and the center frequency of the information channel is used as a reference for transmission. The LPD/LPI channel is moved to the designated frequency bins relative to the information carrier's center frequency in a manner that would only be known to the transmitter and receiver or receivers.

Example 10

A satellite earth station may be configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. Multiple LPD/LPI channels that may carry cryptographic keying information and/or sensitive information are completely under the information carrier and are encrypted, modulated, spread and transmitted using a constant carrier transmission method. For this example, the earth station transmits the information carrier signal over a variety of frequencies in a frequency hopping manner. The LPD/LPI channels are combined with the information carrier signal and the center frequency of the information channel is used as a reference for transmission. The LPD/LPI channels are moved to the designated frequency bins relative to the information carrier's center frequency in a manner that would only be known to the transmitter and receivers.

Example 11

In particular implementations of the system described in Example 10, a satellite earth station is configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. Multiple LPD/LPI channels that may carry cryptographic keying information and/or sensitive information are partially under the information carrier and are encrypted, modulated, spread and transmitted using a constant carrier transmission method. For this example, the earth station transmits the information carrier over a variety of frequencies in a frequency hopping manner. The LPD/LPI channels are combined with information carrier and the center frequency of the information channel is used as a reference for transmission. The LPD/LPI channels are moved to the designated frequency bins relative to the information carrier's center frequency in a manner that would only be known to the transmitter and receivers.

Example 12

In particular implementations of the system described in Example 10, a satellite earth station is configured to operate at an allocated bandwidth for transmission to a satellite repeating relay at a geo-equatorial location. Information is first bulk encrypted and modulated using a constant carrier transmission method for the information carrier. The information carrier is hopped over a range, within the allocated bandwidth. Multiple LPD/LPI channels that may carry cryptographic keying information and/or sensitive information are not under the information carrier and are encrypted, modulated, spread and transmitted using a constant carrier transmission method. For this example, the earth station transmits the information carrier signal over a variety of frequencies in a frequency hopping manner. The LPD/LPI channels are combined with the information carrier signal and the center frequency of the information channel is used as a reference for transmission. The LPD/LPI channels are moved to the designated frequency bins relative to the information carrier's center frequency in a manner that would only be known to the transmitter and receivers.

Example 13

A satellite earth station may be configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. A single LPD/LPI channel may carry cryptographic keying information and/or sensitive information is completely under the information carrier and is encrypted, modulated, spread and transmitted using a constant carrier transmission method. For this example, the earth station transmits the information carrier signal over a range of frequencies in a dithering manner. The LPD/LPI channel is combined with the information carrier signal and the center frequency of the information channel is used as a reference for transmission. The LPD/LPI channel is moved to the designated frequency bins relative to the information carrier signal's center frequency in a manner that would only be known to the transmitter and receiver or receivers.

Example 14

In particular implementations of the system described in Example 13, a satellite earth station is configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. A single LPD/LPI channel may carry cryptographic keying information and/or sensitive information is partially under the information carrier and is encrypted, modulated, spread and transmitted using a constant carrier transmission method. For this example, the earth station transmits the information carrier signal over a range of frequencies in a dithering manner. The LPD/LPI channel is combined with information carrier signal and the center frequency of the information channel is used as a reference for transmission. The LPD/LPI channel is moved to the designated frequency bins relative to the information carrier's center frequency in a manner that would only be known to the transmitter and receiver or receivers.

Example 15

In particular implementations of the system described in Example 13, a satellite earth station is configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. A single LPD/LPI channel may carry cryptographic keying information and/or sensitive information is not under the information carrier and is encrypted, modulated, spread and transmitted using a constant carrier transmission method. For this example, the earth station transmits the information carrier over a range of frequencies in a dithering manner. The LPD/LPI channel is combined with the information carrier signal and the center frequency of the information channel is used as a reference for transmission. The LPD/LPI channel is moved to the designated frequency bins relative to the information carrier signal's center frequency in a manner that would only be known to the transmitter and receiver or receivers.

Example 16

A satellite earth station may be configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. Multiple LPD/LPI channels that may carry cryptographic keying information and/or sensitive information are completely under the information carrier signal and are encrypted, modulated, spread and transmitted using a constant carrier transmission method. For this example, the earth station transmits the information carrier signal over a range of frequencies in a dithering manner. The LPD/LPI channels are combined with the information carrier signal and the center frequency of the information channel is used as a reference for transmission. The LPD/LPI channels are moved to the designated frequency bins relative to the information carrier's center frequency in a manner that would only be known to the transmitter and receiver or receivers.

Example 17

In particular implementations of the system described in Example 13, a satellite earth station is configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. Multiple LPD/LPI channels that may carry cryptographic keying information and/or sensitive information are partially under the information carrier and are encrypted, modulated, spread and transmitted using a constant carrier transmission method. For this example, the earth station transmits the information carrier signal over a range of frequencies in a dithering manner. The LPD/LPI channels are combined with the information carrier signal and the center frequency of the information channel is used as a reference for transmission. The LPD/LPI channels are moved to the designated frequency bins relative to the information carrier signal's center frequency in a manner that would only be known to the transmitter and receiver or receivers.

Example 18

In particular implementations of the system described in Example 13, a satellite earth station is configured to operate at an allocated bandwidth for transmission to a satellite repeating relay at a geo-equatorial location. Information is first bulk encrypted and modulated using a constant carrier transmission method for the information carrier. The information carrier is swept or dithered over a range, within the allocated bandwidth. Multiple LPD/LPI channels that may carry cryptographic keying information and/or sensitive information are not under the information carrier and are encrypted, modulated, spread and transmitted using a constant carrier transmission method. For this example, the earth station transmits the information carrier signal over a range of frequencies in a dithering manner. The LPD/LPI channels are combined with the information carrier signal and the center frequency of the information channel is used as a reference for transmission. The LPD/LPI channels are moved to the designated frequency bins relative to the information carrier signal's center frequency in a manner that would only be known to the transmitter and receiver or receivers.

In places where the description above refers to particular implementations of to telecommunication systems and techniques for transmitting data across a telecommunication channel, it should be readily apparent that a number of modifications may be made without departing from the spirit thereof and that these implementations may be applied to other to telecommunication systems and techniques for transmitting data across a telecommunication channel.

The invention claimed is:

1. A method of reducing probability of detection and interception of a sub-carrier signal comprising:
   encoding, using an encoder, information that is to be transmitted via the sub-carrier signal;
   modulating, using a modulator, the encoded information such that a modulated sub-carrier signal results;
   spreading, using a spreader, the modulated sub-carrier signal such that a spread sub-carrier signal results;
   combining, using an embedding device, the spread sub-carrier signal and an original carrier signal such that a composite carrier signal results; and
   transmitting the composite carrier signal such that the spread sub-carrier signal is at a frequency that is dynamic relative to a static frequency of the original carrier signal.

2. The method of claim 1, further comprising:
   encrypting, using an encryption device, the information prior to encoding.

3. The method of claim 1, wherein the spreading uses a Pseudo Random Number (PRN) such that the spread sub-carrier signal has a Direct Sequence Spread Spectrum (DSSS).

4. The method of claim 1, wherein the spreading uses a PRN to randomize a Frequency Hopping Spread Spectrum (FHSS) that results in hopping of a center frequency of the sub-carrier signal.

5. The method of claim 4, further comprising steering the center frequency of the sub-carrier signal relative to a center frequency of the original carrier signal using a Direct Digital Synthesizer (DDS) or a Number Controlled Oscillator (NCO).

6. A method of reducing probability of detection and interception of a sub-carrier signal comprising:
   encoding, using an encoder, information that is to be transmitted via the sub-carrier signal;
   modulating, using a modulator, the encoded information such that a modulated sub-carrier signal results;
   spreading, using a spreader, the modulated sub-carrier signal such that a spread sub-carrier signal results;
   combining, using an embedding device, the spread sub-carrier signal and an original carrier signal such that a composite carrier signal results; and
   transmitting the composite carrier signal such that the spread sub-carrier signal is at a frequency that is dynamic relative to the original carrier signal that has a dynamic frequency wherein the differential between the frequencies of the sub-carrier signal and original carrier signal is dynamic.

7. The method of claim 6, further comprising:
encrypting, using an encryption device, the information prior to encoding.

8. The method of claim 6, wherein the spreading uses a Pseudo Random Number (PRN) such that the spread sub-carrier signal has a Direct Sequence Spread Spectrum (DSSS).

9. The method of claim 6, wherein the spreading uses a PRN to randomize a Frequency Hopping Spread Spectrum (FHSS) that results in hopping of a center frequency of the sub-carrier signal.

10. The method of claim 9, further comprising steering the center frequency of the sub-carrier signal relative to a center frequency of the original carrier signal using a Direct Digital Synthesizer (DDS) or a Number Controlled Oscillator (NCO).

11. The method of claim 6, further comprising using a PRN to randomize a Frequency Hopping Spread Spectrum (FHSS) that results in hopping of a center frequency of the original carrier signal.

12. The method of claim 11, further comprising steering the center frequency of the original carrier signal using a Direct Digital Synthesizer (DDS) or a Number Controlled Oscillator (NCO).

13. A method of reducing probability of detection and interception of a sub-carrier signal comprising:
encoding, using an encoder, information that is to be transmitted via the sub-carrier signal;
modulating, using a modulator, the encoded information such that a modulated sub-carrier signal results;
spreading, using a spreader, the modulated sub-carrier signal such that a spread sub-carrier signal results;
combining, using an embedding device, the sub-carrier signal and an original carrier signal such that a composite carrier signal results; and
transmitting the composite carrier signal such that the spread sub-carrier signal is at a frequency that is dynamic relative to the original carrier signal having a dithering frequency movement wherein the differential between the frequencies of the sub-carrier signal and original carrier signal is constant.

14. The method of claim 13, further comprising:
encrypting, using an encryption device, the information prior to encoding.

15. The method of claim 13, wherein the spreading uses a Pseudo Random Number (PRN) such that the spread sub-carrier signal has a Direct Sequence Spread Spectrum (DSSS).

16. The method of claim 13, further comprising using a control algorithm to dither a center frequency of the original carrier signal.

17. The method of claim 16, further comprising steering the center frequency of the original carrier signal using a Direct Digital Synthesizer (DDS) or a Number Controlled Oscillator (NCO).

18. The method of claim 13, wherein the spreading uses a PRN to randomize a Frequency Hopping Spread Spectrum (FHSS) for dithering a center frequency of the sub-carrier signal.

19. The method of claim 18, further comprising steering the center frequency of the sub-carrier signal relative to a center frequency of the original carrier signal using a Direct Digital Synthesizer (DDS) or a Number Controlled Oscillator (NCO).

20. A method of receiving a sub-carrier signal having reduced probability of detection and interception comprising:
receiving, using a receiving device, a composite carrier signal comprising an original carrier signal having a static frequency and a sub-carrier signal;
despreading, using a despreader the sub-carrier signal;
demodulating, using a demodulator, the despread sub-carrier signal;
decoding, using a decoder, information received within the demodulated sub-carrier signal using the static frequency of the original carrier signal as a reference to determine a frequency offset of the sub-carrier signal relative to the original carrier signal based on an a priori PRN sequence; and
using a Direct Digital Synthesizer (DDS) or a Number Controlled Oscillator (NCO) to steer the center frequency of the sub-carrier signal relative to a center frequency of the original carrier signal.

21. The method of claim 20, further comprising receiving, using a static frequency receiver, the original carrier signal.

22. The method of claim 20, further comprising decrypting, using a decryption device, the decoded information.

23. A method of receiving a sub-carrier signal having reduced probability of detection and interception comprising:
receiving, using a receiving device, a composite carrier signal comprising an original carrier signal having a frequency hopping center frequency and a sub-carrier signal;
despreading, using a despreader the sub-carrier signal;
demodulating, using a demodulator, the despread sub-carrier signal; and
decoding, using a decoder, information received within the demodulated sub-carrier signal using the frequency hopping center frequency of the original carrier signal as a reference to determine a frequency offset of the sub-carrier signal relative to the original carrier signal based on an a priori PRN sequence; and
using a Direct Digital Synthesizer (DDS) or a Number Controlled Oscillator (NCO) to steer the center frequency of the original carrier signal and to steer a center frequency of the sub-carrier signal relative to the center frequency of the original carrier signal.

24. The method of claim 23, further comprising receiving, using a frequency hopping spread spectrum receiver, the original carrier signal.

25. The method of claim 23, further comprising decrypting, using a decryption device, the decoded information.

26. A method of receiving a sub-carrier signal having reduced probability of detection and interception comprising:
receiving, using a receiving device, a composite carrier signal comprising an original carrier signal having a dithering frequency and a sub-carrier signal;
despreading, using a despreader the sub-carrier signal;
demodulating, using a demodulator, the despread sub-carrier signal; and
decoding, using a decoder, information received within the demodulated sub-carrier signal using the dithering frequency of the original carrier signal as a reference to determine a frequency offset of the sub-carrier signal relative to the original carrier signal based on an a priori PRN sequence; and
using a Direct Digital Synthesizer (DDS) or a Number Controlled Oscillator (NCO) to steer a center frequency of the original carrier signal and to steer a center frequency of the sub-carrier signal relative to the center frequency of the original carrier signal.

27. The method of claim 26, further comprising receiving, using a frequency agile receiver, the original carrier signal.

28. The method of claim 26, further comprising decrypting, using a decryption device, the decoded information.

29. A system for reducing probability of detection and interception of a sub-carrier signal comprising:
   an encoder that encodes information that is to be transmitted via the sub-carrier signal;
   a modulator that modulates the encoded information such that a modulated sub-carrier signal results;
   a spreader that spreads the modulated sub-carrier signal such that a spread sub-carrier signal results;
   an embedding device that combines the sub-carrier signal and an original carrier signal such that a composite carrier signal results; and
   a transmitting device that transmits the composite carrier signal such that the spread sub-carrier signal is at a frequency that is dynamic relative to the original carrier signal that has a static frequency.

30. The system of claim 29, further comprising:
   an encryption device that encrypts the information prior to encoding.

31. The system of claim 29, wherein the spreader uses a Pseudo Random Number (PRN) such that the spread sub-carrier signal has a Direct Sequence Spread Spectrum (DSSS).

32. The system of claim 29, wherein the spreader uses a PRN to randomize a Frequency Hopping Spread Spectrum (FHSS) that results in hopping of a center frequency of the sub-carrier signal.

33. The system of claim 32, further comprising a Direct Digital Synthesizer (DDS) or a Number Controlled Oscillator (NCO) that steers the center frequency of the sub-carrier signal relative to a center frequency of the original carrier signal.

34. A system of reducing probability of detection and interception of a sub-carrier signal comprising:
   an encoder that encodes information that is to be transmitted via the sub-carrier signal;
   a modulator that modulates the encoded information such that a modulated sub-carrier signal results;
   a spreader that spreads the modulated sub-carrier signal such that a spread sub-carrier signal results;
   an embedding device that combines the sub-carrier signal and an original carrier signal such that a composite carrier signal results; and
   a transmitting device that transmits the composite carrier signal such that the spread sub-carrier signal is at a frequency that is dynamic relative to the original carrier signal that has a dynamic frequency wherein the differential between the frequencies of the sub-carrier signal and original carrier signal is dynamic.

35. The system of claim 34, further comprising:
   an encryption device that encrypts the information prior to encoding.

36. The system of claim 34, wherein the spreader uses a Pseudo Random Number (PRN) such that the spread sub-carrier signal has a Direct Sequence Spread Spectrum (DSSS).

37. The system of claim 34, wherein the spreader uses a PRN to randomize a Frequency Hopping Spread Spectrum (FHSS) that results in hopping of a center frequency of the sub-carrier signal.

38. The system of claim 37, further comprising a Direct Digital Synthesizer (DDS) or a Number Controlled Oscillator (NCO) that steers the center frequency of the sub-carrier signal relative to a center frequency of the original carrier signal.

39. The system of claim 34, further comprising a PRN that randomizes a Frequency Hopping Spread Spectrum (FHSS) and results in hopping of a center frequency of the original carrier signal.

40. The system of claim 39, further comprising a Direct Digital Synthesizer (DDS) or a Number Controlled Oscillator (NCO) that steers the center frequency of the original carrier signal.

41. A system of reducing probability of detection and interception of a sub-carrier signal comprising:
   an encoder that encodes information that is to be transmitted via the sub-carrier signal;
   a modulator that modulates the encoded information such that a modulated sub-carrier signal results;
   a spreader that spreads the modulated sub-carrier signal such that a spread sub-carrier signal results;
   an embedding device that combines the sub-carrier signal and an original carrier signal such that a composite carrier signal results; and
   a transmitting device that transmits the composite carrier signal such that the spread sub-carrier signal is at a frequency that is dynamic relative to the original carrier signal that has a dithering frequency movement wherein the differential between the frequencies of the sub-carrier signal and original carrier signal is constant.

42. The system of claim 41, further comprising:
   an encryption device that encrypts the information prior to encoding.

43. The system of claim 41, wherein the spreader uses a Pseudo Random Number (PRN) such that the spread sub-carrier signal has a Direct Sequence Spread Spectrum (DSSS).

44. The system of claim 41, further comprising a control algorithm that dithers a center frequency of the original carrier signal.

45. The system of claim 44, further comprising a Direct Digital Synthesizer (DDS) or a Number Controlled Oscillator (NCO) that steers the center frequency of the original carrier signal.

46. The system of claim 41, wherein the spreader uses a PRN to randomize a Frequency Hopping Spread Spectrum (FHSS) for dithering a center frequency of the sub-carrier signal.

47. The system of claim 46, further comprising a Direct Digital Synthesizer (DDS) or a Number Controlled Oscillator (NCO) that steers the center frequency of the sub-carrier signal relative to a center frequency of the original carrier signal using a Direct Digital Synthesizer (DDS) or a Number Controlled Oscillator (NCO).

48. A system for receiving a sub-carrier signal having reduced probability of detection and interception comprising:
   a receiving device that receives a composite carrier signal comprising an original carrier signal having a static frequency and a sub-carrier signal;
   a despreader that despreads the sub-carrier signal;
   a demodulator that demodulates the despread sub-carrier signal;
   a decoder that decodes information received within the demodulated sub-carrier signal using the static frequency of the original carrier signal as a reference to determine a frequency offset of the sub-carrier signal relative to the original carrier signal based on an a priori PRN sequence; and a Direct Digital Synthesizer (DDS) or a Number Controlled Oscillator (NCO) that steers a center frequency of the sub-carrier signal relative to a center frequency of the original carrier signal.

49. The system of claim 48, further comprising a static frequency receiver that receives the original carrier signal.

50. The system of claim 48, further comprising a decryption device that decrypts the decoded information.

51. A system for receiving a sub-carrier signal having reduced probability of detection and interception comprising:
   a receiving device that receives a composite carrier signal comprising an original carrier signal having a static frequency and a sub-carrier signal;
   a despreader that despreads the sub-carrier signal;
   a demodulator that demodulates the despread sub-carrier signal;
   a decoder that decodes information received within the demodulated sub-carrier signal using the frequency hopping center frequency of the original carrier signal as a reference to determine a frequency offset of the sub-carrier signal relative to the original carrier signal based on an a priori PRN sequence; and
   a Direct Digital Synthesizer (DDS) or a Number Controlled Oscillator (NCO) that steers the center frequency of the original carrier signal and steers a center frequency of the sub-carrier signal relative to the center frequency of the original carrier signal.

52. The system of claim 51, further comprising a frequency hopping spread spectrum receiver that receives the original carrier signal.

53. The system of claim 51, further comprising a decryption device that decrypts the decoded information.

54. A system for receiving a sub-carrier signal having reduced probability of detection and interception comprising:
   a receiving device that receives a composite carrier signal comprising an original carrier signal having a static frequency and a sub-carrier signal;
   a despreader that despreads the sub-carrier signal;
   a demodulator that demodulates the despread sub-carrier signal; and
   a decoder that decodes information received within the demodulated sub-carrier signal using the dithering frequency of the original carrier signal as a reference to determine a frequency offset of the sub-carrier signal relative to the original carrier signal based on an a priori PRN sequence; and
   a Direct Digital Synthesizer (DDS) or a Number Controlled Oscillator (NCO) that steers a center frequency of the original carrier signal and steers a center frequency of the sub-carrier signal relative to the center frequency of the original carrier signal.

55. The system of claim 54, further comprising a frequency agile receiver that receives the original carrier signal.

56. The system of claim 54, further comprising a decryption device that decrypts the decoded information.

* * * * *